United States Patent

[11] 3,572,860

[72] Inventor Robert F. Hart
     Downers Grove, Ill.
[21] Appl. No. 834,703
[22] Filed June 19, 1969
[45] Patented Mar. 30, 1971
[73] Assignee General Motors Corporation
     Detroit, Mich.

[54] MODIFIED CYLINDRICAL ROLLER BEARING
     7 Claims, 4 Drawing Figs.
[52] U.S. Cl. ..................................................... 308/213
[51] Int. Cl. ................................................... F16c 13/00
[50] Field of Search .......................................... 308/212,
     213, 214

[56] References Cited
     FOREIGN PATENTS
     803,501  10/1958  Great Britain ............... 308/212

Primary Examiner—Fred C. Mattern, Jr.
Assistant Examiner—Frank Susko
Attorneys—Warren E. Finken and F. J. Fodale ABSTRACT: A roller bearing comprising crowned cylindrical rollers in combination with a cylindrical outer race and an inner race is disclosed. In a second configuration, the cross section of the inner race is in the form of an arc with the high point offset from the center plane of the bearing. Both bearings improve life in situations where the rotatably supported member imposes a misalignment between the bearing races.

PATENTED MAR 30 1971

INVENTOR.
Robert F. Hart
BY
F. J. Fodale
ATTORNEY

INVENTOR.
Robert F. Hart
BY
F. J. Fodale
ATTORNEY

MODIFIED CYLINDRICAL ROLLER BEARING

My invention relates to roller bearings and more particularly to roller bearings subject to misalignment.

Broadly, the object of my invention is to improve the life of a roller bearing subjected to misalignment such as may be introduced by an overhung load. This is accomplished by building an obliquity into the bearing to accommodate the misalignment occurring at a rated load.

My invention includes two features. The first feature improves bearing life by accommodating a particular misalignment. The second feature in combination with the first improves bearing life by accommodating a range of misalignment.

The exact nature of this invention as well as other features and advantages thereof will be readily apparent from consideration of the following specification relating to the annexed drawing in which.

Figure 1:
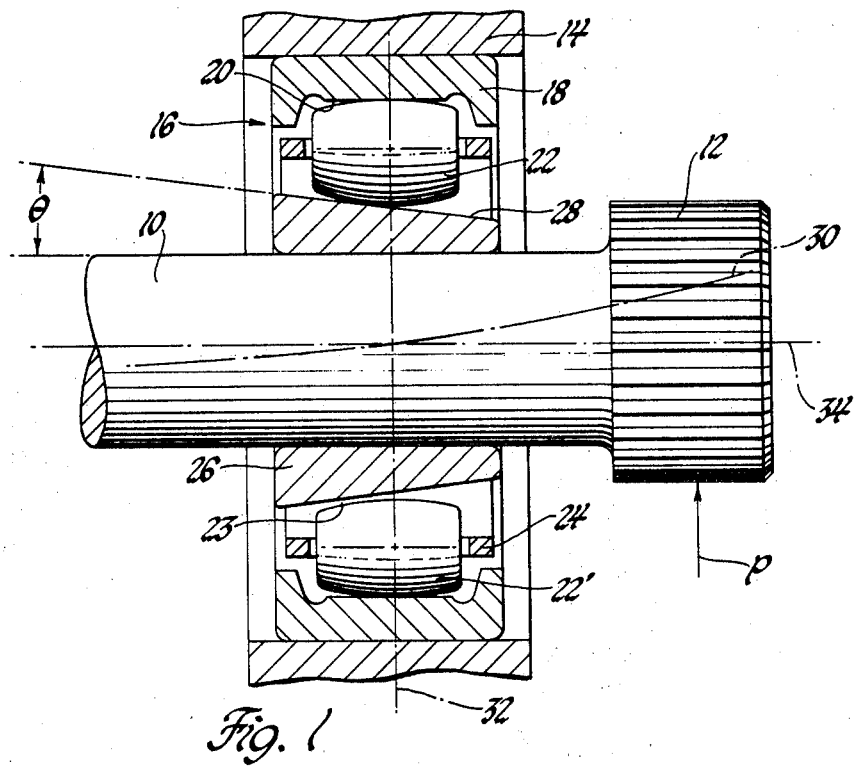
FIG. 1 is a meridional cross section of a roller bearing in accordance with a first embodiment of my invention showing the races aligned and which incorporates both features of my invention and is also used to explain the first or basic feature of my invention.
Figure 2:
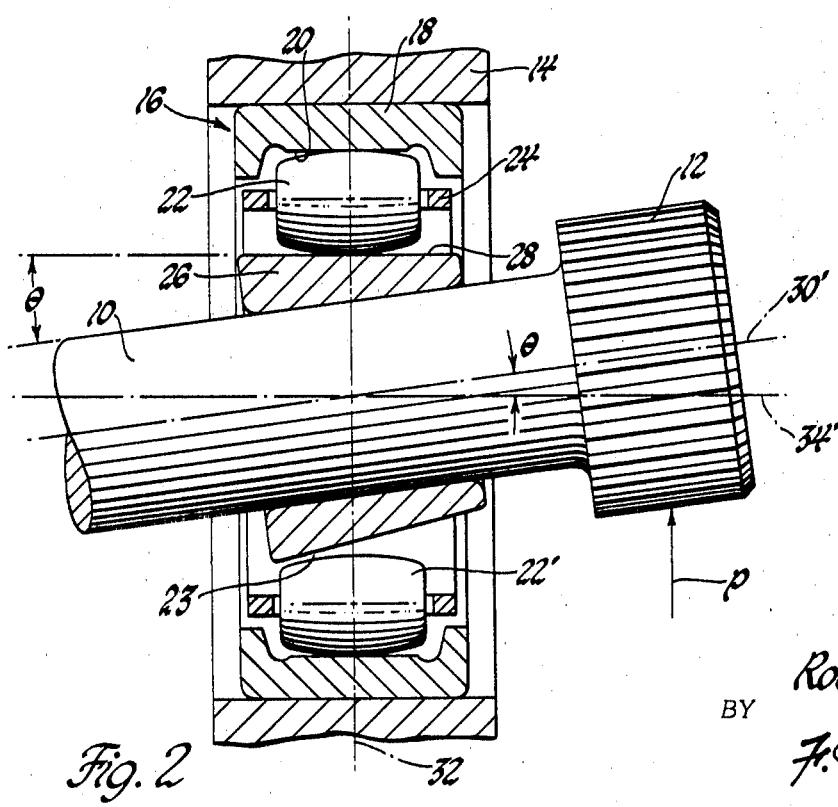
FIG. 2 is a view similar to FIG. 1 showing the races in their rated misalignment.

Referring now to the drawings and more particularly to FIG. 1, the first embodiment of my invention is shown. A shaft 10 having a gear 12 is journaled in a support 14 by a roller bearing indicated generally at 16. The roller bearing 16 includes an outer race 18 with a raceway 20 is truly cylindrical, that is, cylindrical within accepted manufacturing practices. The bearing 16 also includes a complement of rollers which may be circumferentially spaced by a separator or cage 24. The separator or cage 24 may be of any suitable design and is herein illustrated as a sheet metal cylinder with stamped roller receiving pockets. A radial load upon the bearing will cause some number of the complement of rollers to be loaded, the number depending upon the internal clearance of the bearing, but in general, being fewer than one-half of the total number of rollers. In FIGS. 1 and 2, the varying radial load P (varying in the sense that it varies from zero to a substantially predictable maximum load) causes a loaded roller 22 to be in contact with the inner raceway 28. The unloaded roller 22', in general, remains in contact with the outer raceway 20 due to centrifugal force while the shaft is rotating. The internal clearance of the bearing is sufficient to cause a gap 23 between the unloaded roller 22' and the inner raceway 28 under the entire range of load and misalignment conditions shown in FIGS. 1 and 2. the inner race 26 of the bearing has a tapered raceway 28 with the amount of taper represented by the angle $\theta$. The angle $\theta$ is greatly exaggerated in FIGS. 1 and 2 for the purposes of explanation and in actuality the angle is small, generally less than 0.02 radians.

In general, all bearing applications involve some misalignment which is proportional to the bearing load. FIG. 1 represents a particular system wherein the shaft 10 is supported by two spaced bearings and is subjected to an overhung load which may be considered as a concentrated load P, as indicated. This system is found in large traction motors at the pinion bearing end with gear 12 representing the pinion. In such a system, misalignment which occurs between the races of the bearing 16 may be divided into two parts. The first part is proportional to load and is the misalignment attributable to the elastic deformation of the structural components, such as the races, rollers, shaft, support, etc. The second part is due to clearances and dimensional imperfections in manufacturing and is essentially independent of load, since only an insignificant load is required to take up the clearances. The misalignment due to both of these factors is graphically illustrated as a movement of the centerline 34 of the shaft 10 to the dotted curve position 30 in FIG. 1. The curve 30 results in part from elastic deformation of components other than the shaft and also results in part from the takeup of bearing clearances at both ends of the shaft. Line 32 represents the center plane of the bearing 16. For the present purposes, a straight line 30' having a slope equal to the slope of the curve 30 at the center plane 32 of the bearing may be used in place of curve 30. This is illustrated graphically in FIG. 2 where line 30' represents the linearized curve 30 which forms an angle $\theta$ with the line 34', the original centerline of the shaft. The taper angle $\theta$ on the inner race 26 is this same angle $\theta$. While the slope of the shaft may be determined theoretically for a given load P by beam analysis, other factors such as deflections in the support 14, outer race 18, rollers 22, and other members in the above-mentioned system may make the problem more susceptible to an experimental solution. Thus, the bearing 16 can be considered as including a "rated misalignment angle" $\theta$, that is, a misalignment angle is built into the bearing to accommodate the misalignment caused by a given load so that the contact between the raceway 28 and the loaded roller 22, diametrically opposed to the load P, is centered on the center plane 32 as seen in FIG. 2. Another way of stating this is that the condition shown in FIG. 2 will occur at the rated load.

In its broadest sense, my invention is directed to building a rated misalignment angle into the bearing for a given load or stated another way, fitting the bearing components to a "rated load." While I have illustrated a tapered inner race in combination with cylindrical rollers and a cylindrical outer race, the taper could be transferred to either the rollers or the outer race. A total taper equal to the rated misalignment could also be distributed to the inner race, the rollers, and the outer race in any proportions.

I have found that a bearing constructed in accordance with the above-described principles improves bearing life, however, it appears sensitive to variations from the rated load. Such a bearing is suitable for use where the load P is essentially constant with hardly any variations or where misalignment proportional to load is small compared to that which is independent of load, as for instance, in the case of a stiff support, stiff housing and relatively large radial play in the bearing. Such a bearing would require rollers with only enough crowning to prevent edge loading. In instances where the load varies within a given range and the misalignment due to elastic deformation is significant, I have incorporated an additional feature into the bearing. As noted above, the total misalignment in a bearing may be considered as being composed of two parts, one proportional to load and the other independent of load. My invention also includes the concept of accommodating both these two parts in different ways. The rated misalignment attributable to a rated load is accommodated by a taper or conicity in one or more of the three components is; the rollers, inner race, and outer race. Variations from that rated load, that is, loads either in excess of the rated load or less than the rated load, will cause a variation in the misalignment of the bearing. This variation in misalignment is accommodated by a crown or convexity applied to one or more of the same three components. This convexity serves the additional function of accommodating the portion of the misalignment which is independent of load, the part due to variations in clearance, lineup, or manufacturing. It should be noted that the ultimate objective in selectively combining a taper with a crown is maximum fatigue life which implies approximately equal fatigue lives near the center and near the ends of the roller paths. To this end, the crown or convexity of one or more of the three bearing components may be varied to prevent both excessive edge loading and excessively high contact stresses at the central region of the rollers.

Similar to the taper distribution discussed above, there is considerable leeway in the selection of which component or components are to be crowned, that is, to have a convex profile in the meridional plane. In FIG. 1, I have illustrated a bearing wherein all of the crown or convexity is placed upon the rollers; the inner race being made truly conical and the outer race truly cylindrical. For convenience, the rollers are shown in FIGS. 1 and 2 as having a circular arc defining their crown, but it should be understood that a more complex crown profile of varying curvature may be more desirable and that this profile need not be symmetrical about the transverse center plane of the roller. It should further be understood that the amount of crown has been grossly exaggerated for purposes of illustration and that the deviation of the rollers from true cylinders would generally be no more than a few thousandths of an inch and not perceptible to the eye, however, it would be more than that normally provided to eliminate edge loading which was referred to above. Alternatively, the rollers could be truly cylindrical, and both races crowned, by like or unlike amounts. Another possibility is to have one race not crowned, and the other race and roller crowned by like and unlike amounts.

Figure 3:
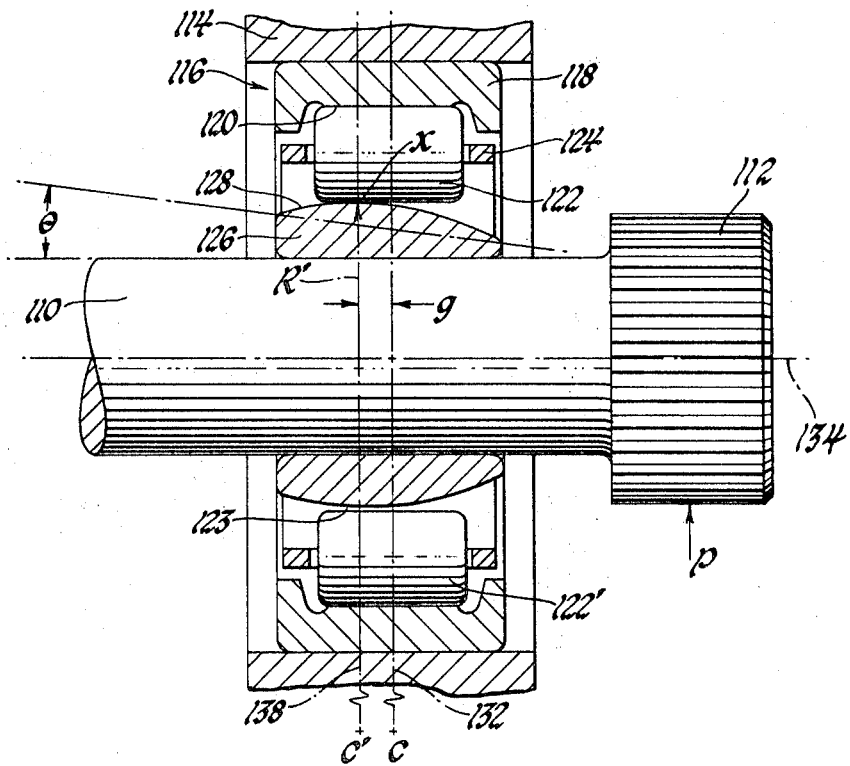
FIG. 3 is a meridional cross section of a roller bearing in accordance with a second embodiment of my invention showing the races aligned.
Figure 4:
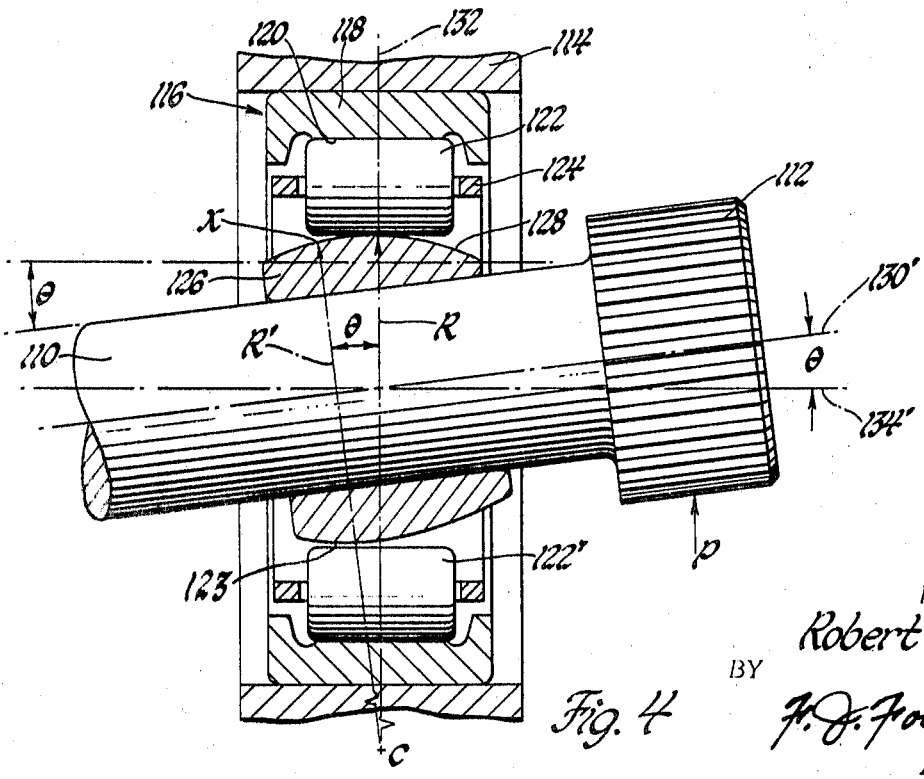
FIG. 4 is a view similar to FIG. 3 showing the races in their rated misalignment.

A second example of the combinations possible is the bearing shown in FIGS. 3 and 4. This embodiment of my invention again has the taper on the inner race as did the first bearing. The outer race is again uncrowned, but in this bearing substantially all of the portion of the crown whose purpose is to accommodate misalignment has been applied to the inner race, with only enough crown being applied to the roller to prevent edge loading. For purposes of clarity in illustration, the rollers in FIGS. 3 and 4 are drawn as true cylinders without an exaggeration of the crown, while the crown and the taper on the inner race have been grossly exaggerated. Comparable parts are identified by adding 100 to the identification numerals for FIGS. 1 and 2.

Referring first to FIG. 4, the inner race 126 is seen to include the rated misalignment angle $\theta$, however, the raceway 128 is smoothly curved, superimposing a crown on the taper. In general, the raceway 128 may be any smooth continuous curve and need not be symmetrical. The criterion to be strived for is equal cumulative fatigue at the center and the ends of the roller considering all running conditions. The curve should have a zero slope at the center plane 132 of the bearing when the inner race is in its rated misaligned position shown in FIG. 4. For convenience, this curve is shown in FIGS. 3 and 4 as a circular arc having a relatively large radius R. This circular arc is such that in the misaligned position of the inner race 126 such as is shown in FIG. 4, the center C of the circle defining the arc is on the center plane 132 of the bearing 116 thus centering the applied load on the loaded roller 122.

Considering a large radius and a small angle $\theta$, one can visualize the surface 128 rocking on the loaded roller 122 from its position at rated load shown in FIG. 4 to its position at zero load shown in FIG. 3.

In FIG. 4, R is the radius from the center C to the point of contact at the center plane 132. The radius R is thus perpendicular to the line 134' and has its center C in the center plane 132. R' is a radius perpendicular to the linearized curve 130' and is thus rotated $\theta$ degrees from the radius R. The radius R' locates the point X, the point of contact when the races are aligned as shown in FIG. 3. The distance $g$ from point X to the center plane 132 is apparent from FIG. 4 and is approximately defined by:

$g = R\theta$ where $\theta$ is dimensionless and $g$ and R are expressed in the same units.

As the inner race is rocked back to its position in FIG. 3, the radius R' is rotated about point X until the curved raceway 128 is tangent to the roller at point X. The radius R' is perpendicular to the original centerline 134 and is centered from C' which lies in a plane 138 parallel to and spaced by a distance $g$ to the center plane 132 of the bearing on the side toward the larger tapered end of the inner race. From a manufacturing standpoint, the entire inner raceway is then made a body of revolution about the centerline of the inner race conforming to this circular arc. I have considered only the curvature of the inner race at its contact with the loaded roller 122, as noted earlier, my experience having shown that the conditions at other roller locations are unimportant because of the manner in which the rollers are loaded.

Thus from FIG. 3, it is seen that the inner race 126 has its raceway 128 in the form of a circular arc with the center of the arc offset from the center plane of the bearing.

In placing a circular offset crown on a bearing with a rated taper, recall that the relationship between the crown radius R and the offset $g$ is determined by the rated misalignment angle $\theta$. While satisfying this relationship, R and $g$ are selected to provide approximately equal cumulative fatigue at the roller center and roller ends under the actual operating conditions of the bearing within its variable loading range.

By way of example, a roller bearing in accordance with the second embodiment of my invention with an indicated improved life had a nominal O.D. of 11.0 inches, a bore of 5.1 inches and the diameter of the inner race was 6.5 inches. Experimentally, I determined that the bearing should have a rated misalignment angle of approximately 0.00067 radians. The inner raceway had a circular arc of 300 in. radius offset approximately 0.2 inch from the center plane of the bearing.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

I claim:

1. A roller bearing for use with a rotatable member which imposes a substantially constant, unidirectional load on the bearing producing a predetermined misalignment angle between the bearing races comprising in combination:

an outer race having an inner rolling contact surface;
an inner race having an outer rolling contact surface;
a complement of rollers having a generally cylindrical rolling contact surface, said rollers being disposed between said races with said rolling contact surface engageable with said rolling contact surfaces on said races; and
one of said race rolling contact surfaces being generally cylindrical and the other of said race rolling contact surfaces being frustoconical and having a taper substantially equal to said misalignment angle of the rotatable member at the center plane of the bearing whereby said bearing operates with its races angularly related to each other by said misalignment angle when said rotatable member imposes said load.

2. A roller bearing comprising in combination:
an outer race having a rolling contact surface;
an inner race having a rolling contact surface; and
a complement of rollers having a rolling contact surface, said rollers being disposed between said races with their rolling contact surface rollably engageable with said rolling contact surfaces of said raceways, one of said rolling contact surfaces being a convex curve with a crown offset from the center plane of the bearing and the other rolling contact surfaces being substantially cylindrical whereby said bearing accommodates a misalignment between said inner and outer race.

3. The combination as defined in claim 1 wherein said convex curved surface is on said inner race.

4. The combination as defined in claim 3 wherein said curved surface is a circular arc whose center lies in a plane offset from the center plane of the bearing.

5. The combination as defined in claim 4 wherein said plane is offset from said center plane by a distance $g$ and wherein said circular arc has a radius which is substantially equal to the quotient of the distance $g$ divided by the angle $\theta$ in radians where $\theta$ is the misalignment accommodated between the races.

6. The combination as defined in claim 1 wherein said one rolling contact surface which is frustoconical is on said inner race and wherein said rollers have convexly curved rolling contact surfaces in the form of a circular arc symmetrical about the center plane of the bearing.

7. A roller bearing comprising in combination:
an outer raceway having a substantially cylindrical raceway;

a complement of substantially cylindrical rollers rollably engageable with said raceway; and an inner race having a raceway rollably engageable with said rollers, said raceway on said inner race having a profile in the shape of a circular arc whose center is offset with respect to the center plane of the bearing whereby said raceway on said inner race is also rockably engageable with said rollers whereby said bearing accommodates a rated misalignment between said races over a predetermined range.

PO-1050
(5/69)

UNITED STATES PATENT OFFICE
CERTIFICATE OF CORRECTION

Patent No. 3,572,860          Dated March 30, 1971

Inventor(s) Robert F. Hart

It is certified that error appears in the above-identified patent and that said Letters Patent are hereby corrected as shown below:

Column 4, line 58, after "claim" delete "1" insert -- 2

Signed and sealed this 2nd day of May 1972.

(SEAL)
Attest:

EDWARD M. FLETCHER, JR.
Attesting Officer

ROBERT GOTTSCHALK
Commissioner of Pat

Disclaimer 3,572,860.—*Robert F. Hart*, Downers Grove, Ill. MODIFIED CYLINDRICAL ROLLER BEARING. Patent dated Mar. 30, 1971. Disclaimer filed Feb. 14, 1972, by the inventor, and the assignee, *General Motors Corporation*.

Hereby enters this disclaimer to claim 1 of said patent.

[*Official Gazette December 5, 1972.*]